(12) United States Patent
Hwang et al.

(10) Patent No.: US 6,613,480 B1
(45) Date of Patent: Sep. 2, 2003

(54) ELECTROLYTE FOR RECHARGEABLE LITHIUM BATTERY AND RECHARGEABLE LITHIUM BATTERY USING SAME

(75) Inventors: Duck-Chul Hwang, Cheonan-si (KR); Eui-Hwan Song, Cheonan-si (KR); Won-Il Jung, Cheonan-si (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 107 days.

(21) Appl. No.: 09/588,770

(22) Filed: Jun. 2, 2000

(30) Foreign Application Priority Data

Jun. 7, 1999 (KR) .............................. 99-20982

(51) Int. Cl.⁷ .................. H01M 6/16; H01M 10/40; H01G 9/035
(52) U.S. Cl. .................. 429/332; 429/330; 429/326; 429/231.1; 429/231.95; 252/62.2
(58) Field of Search ................. 429/332, 333, 429/336, 330, 326, 327, 231.95, 231.8, 231.4, 231.1; 252/62.2

(56) References Cited

U.S. PATENT DOCUMENTS

| 5,437,945 A | 8/1995 | Omaru et al. |
| 5,472,862 A | 12/1995 | Hattori et al. |
| 5,580,684 A | 12/1996 | Yokoyama et al. ......... 429/194 |
| 5,773,165 A | * 6/1998 | Sugeno ....................... 429/197 |
| 6,139,991 A | 10/2000 | Hamamoto et al. ......... 429/307 |

* cited by examiner

Primary Examiner—Stephen Kalafut
Assistant Examiner—Raymond Alejandro
(74) Attorney, Agent, or Firm—Blakely, Sokoloff, Taylor & Zafman

(57) ABSTRACT

Disclosed is an electrolyte for a rechargeable lithium battery that includes a cyclic carbonate including ethylene carbonate, at least two linear carbonate selected from diethyl carbonate, methyl propyl carbonate, ethyl methyl carbonate or dimethyl carbonate, propyl acetate; and a lithium salt.

12 Claims, 1 Drawing Sheet

A. Example 1
C. Comparative example 1
E. Comparative example 3
F. Comparative example 4
B. Example 2
D. Comparative example 2
G. Comparative example 5

ELECTROLYTE FOR RECHARGEABLE LITHIUM BATTERY AND RECHARGEABLE LITHIUM BATTERY USING SAME

CROSS REFERENCE TO RELATED APPLICATION

This application is based on application No. 99-20982 filed in the Korean Industrial Property Office on Jun. 7, 1999, the content of which is incorporated herein by reference.

BACKGROUND OF THE INVENTION (a) Field of the Invention

The present invention relates to an electrolyte for a rechargeable lithium battery and a rechargeable lithium battery using the same, and more particularly, to an electrolyte for a rechargeable lithium battery exhibiting high capacity.

(b) Description of the Related Art

In recent years, the development of miniaturized portable electronics provokes needs for a rechargeable battery having a high capacity as well as a light weight. From the viewpoint of the capacity improvement per unit weight, the rechargeable lithium battery is preferably adopted because lithium has a high standard potential as well as a low electrochemical equivalent weight.

Metallic lithium has been used for the negative active material in rechargeable lithium batteries. However, during charging, lithium is electroplated onto the metallic lithium electrode, it deposits to form a dendric layer which induces a short circuit between the negative and positive active material. The problem of lithium reactivity toward the electrolyte is addressed by replacing lithium metal with carbon-based materials.

For the positive active material in the rechargeable lithium battery, transition metal oxides are used. Typical examples include $LiCoO_2$, $LiMn_2O_4$, $LiNiO_2$, $LiNi_{1-x}Co_xO_2$ (0<X<1) or $LiMnO_2$. Manganese-based material such as $LiMn_2O_4$ or $LiMnO_2$, is easiest to prepare, is less expensive the other materials and has environmentally friendly characteristics, but it has low capacities. $LiCoO_2$ is widely used as it has a good electrical conductivity and high battery voltage, but it is expensive. $LiNiO_2$ is relatively inexpensive and has a high charge capacity, but it is difficult to produce and has safety problems.

The electrochemical performances of rechargeable lithium batteries depend on the reaction between the positive active material and an electrolyte or between the negative active material and an electrolyte such that the choice of electrolyte, particularly organic solvent is critical to battery performance. There have been attempted to use various organic solvents for electrolytes. It is understood that when an one organic solvent is used alone, rechargeable lithium batteries exhibiting excellent electrochemical performances cannot be obtained, so mixed organic solvents are used.

In addition, the cycle life and capacity of the lithium ion battery greatly depend on the surface reactivity between the electrolyte and the negative active material. Accordingly, the reactivity between the electrolyte and the negative active material rather than the positive active material should be considered when developing the electrolyte composition.

It has been proposed in U.S. Pat. No. 5,437,945 (Sony) to use two components for electrolytes. The electrolyte includes propylene carbonate and methyl ethyl carbonate to improve low-temperature characteristics. Propylene carbonate exhibits good low-temperature characteristics, but has high reactivity with graphite negative active material, and methyl ethyl carbonate has low reactivity with graphite negative active material, but exhibits poor low-temperature characteristics. However, it is insufficient to obtain rechargeable lithium batteries with the desired performance.

To improve low-temperature characteristics, a three-component mixed organic solvent including a solvent having a low freezing point is also used for electrolytes (U.S. Pat. No. 5,474,862 assigned to Matsushita). However, it is still insufficient to provide a rechargeable lithium battery exhibiting good electrochemical properties.

SUMMARY OF THE INVENTION

It is an object of the present invention to provide an electrolyte for a rechargeable lithium battery exhibiting good low-temperature characteristics and high capacity.

It is another object to provide a rechargeable lithium battery using the same.

These and other objects may be achieved by an electrolyte for a rechargeable lithium battery including a cyclic carbonate, at least two linear carbonates selected from diethyl carbonate, methyl propyl carbonate, ethyl methyl carbonate or dimethyl carbonate, propyl acetate, and a lithium salt as a solute.

The present invention provides a rechargeable lithium battery including a positive electrode including a transition metal oxide, a negative electrode including carbonaceous negative active materials from or into which lithium ions are deintercalated or intercalated; and the electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
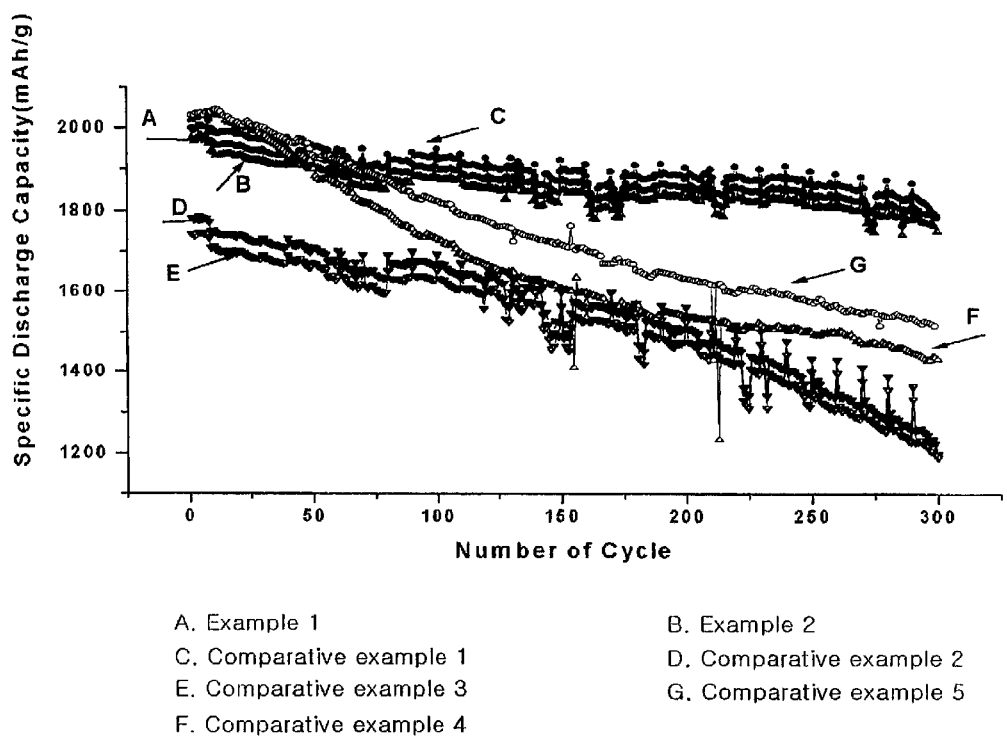
FIG. 1 is a graph illustrating cycle life characteristics of the cells according to Examples 1 and 2 and Comparative Examples 1 to 5 of the present invention.

An electrolyte of the present invention includes a first solvent of cyclic carbonate, a second and a third solvents of at least two linear carbonates selected from diethyl carbonate, methyl propyl carbonate, ethyl methyl carbonate or dimethyl carbonate, and a fourth solvent of propyl acetate. The electrolyte of the present invention further includes a lithium salt as a solute.

Cyclic carbonate may be any cyclic carbonate known in the related arts and the exemplary thereof is ethylene carbonate, which has no reactivity with graphite-based active materials and has a high dielectric constant. The electrolyte includes 20 to 60% by volume of cyclic carbonate. If the amount of cyclic carbonate is less than 20% by volume, the dielectric constant of the electrolyte is reduced and an amount of lithium salts dissolved in the electrolyte is diminished. Whereas, the amount of cyclic carbonate is more than 60% by volume, the low-temperature characteristics of the battery deteriorate because cyclic carbonate has a high freezing point.

Linear carbonates are at least two carbonates selected from dimethyl carbonate, methyl propyl carbonate, ethyl methyl carbonate or diethyl carbonate. The amount of linear carbonate is 30 to 77.5% by volume. If the amount of linear carbonate is less than 30% by volume, the effect of decreasing the viscosity and freezing point of cyclic carbonate is not induced. Whereas, the amount of linear carbonate is more than 77.5% by volume, the effect of decreasing the viscosity and freezing point of cyclic carbonate is induced too much, and an adverse effect may be obtained. The viscosities of dimethyl carbonate, methyl propyl carbonate, ethyl methyl carbonate, and diethyl carbonate are 0.6, 0.9, 0.7, and 0.7 cp at 25° C., respectively. Since the viscosity of dimethyl carbonate is lower than the other carbonates, it is preferably used to solve the problem due to the high viscosity of ethylene carbonate. In addition, the freezing point of dimethyl carbonate, methyl propyl carbonate, ethyl methyl carbonate and diethyl carbonate are 3, −43, −15 and −43° C., respectively. Methyl propyl carbonate having −43° C. exhibit good low-temperature characteristics, but batteries using methyl propyl carbonate exhibits inferior room-temperature cycle characteristics rather than ethyl methyl carbonate or diethyl carbonate. Accordingly, methyl propyl carbonate, ethyl methyl carbonate and diethyl carbonate are more preferably to decrease the freezing point of ethylene carbonate without deteriorating performances of batteries.

Propyl acetate has a low viscosity (0.6 cp at 25° C.) and a low freezing point (−93° C.) and helps to improve low temperature characteristics of the battery. Furthermore, propyl acetate has a relatively higher boiling point (102° C.) than the other acetates such as methyl acetate or ethyl acetate and exhibits good high-temperature storage characteristics. When rechargeable lithium batteries are stored at high temperatures for a long time, gases are generated from the active materials or electrolytes, particularly electrolytes, increasing internal pressure. The increases in internal pressure cause to break current and make to impossible to use the batteries. Accordingly, rechargeable lithium batteries which use the electrolyte having high boiling point, can be stored at high temperatures for a long time, owing to the no occurrence of gas and they have good high-temperature storage characteristics.

The amount of propyl acetate is 2.5 to 30% by volume. If the amount of propyl acetate is less than 2.5% by volume, the effect of the addition of propyl acetate on low-temperature characteristics is not induced. Whereas, the amount of propyl acetate is more than 30% by volume, the cycle life characteristics deteriorate.

The lithium salt is selected from lithium hexafluorophosphate ($LiPF_6$), lithium tetrafluoroborate ($LiBF_4$), lithium fluoroasenate ($LiAsF_6$), lithium perchlorate ($LiClO_4$), lithium trifluoromethanesulfonate ($CF_3SO_3Li$) or a mixture thereof. The electrolyte of the present invention includes a lithium salt with a concentration of 0.5 to 2.0M. If the concentration of lithium salt is less than 0.5M, the effect of facilitating the movement of lithium ions between the positive and the negative electrode is not induced. Whereas, the lithium salt with the concentration above 2.0M is used, no additional effect is shown.

The electrolyte is used in a rechargeable lithium battery that includes a positive electrode formed with a positive active material and a negative electrode formed with a negative active material.

The negative active material is carbonaceous material. The carbonaceous material includes a globular carbonaceous material produced by carbonizing globular particles, or graphite fiber produced by carbonizing mesophase pitch fiber and graphitizing the carbonized pitch. The fibrous graphite has a lattice spacing of $d_{002}$ of 3.35–3.38Å in the (002) plane according to an X-ray diffraction, a crystallinity size in the direction of the c axis of Lc of 20 nm and an exothermic peak at a temperature of 700° C. or more.

The positive active material includes a transition metal oxide and the exemplary thereof are $LiCoO_2$, $LiNi_{1-x}Co_xM_yO_2$ (x is 0 to 0.2, y is 0.001 to 0.02, and M is selected from Mg, Ca, Sr, Ba or La), or $LiMn_xO_2$ (x=1, 2).

The following examples further illustrate the present invention.

Examples 1 and 2 and Comparative Examples 1 to 5

18650 rechargeable lithium cells were manufactured in which the positive active material was $LiNi_{0.9}Co_{0.1}Sr_{0.002}O_2$ and the negative active material was artificial graphite. The compositions of electrolytes in the cells are presented in Table 1.

The low-temperature characteristics, high-temperature storage characteristics, discharge capacity and cycle life characteristics of the cells according to Examples 1 and 2 and Comparative Examples 1 to 5 were measured and the results are shown in Table 1. The high-temperature storage characteristics were determined whether a vent is opened or not. The vent serves to release gas generated during charge and discharge cycles and prevent the battery explosion. In Table 1, EC is the abbreviation for ethylene carbonate, DMC is the abbreviation for dimethyl carbonate, EMC is the abbreviation for ethyl methyl carbonate, PC is the abbreviation for propylene carbonate, and PA is the abbreviation for propyl acetate. The cycle life characteristics are represented by the ratio of the capacity after 300 charge/discharge cycles to that before the charge/discharge cycles, and the low temperature characteristics are represented by the ratio of the capacity at low temperature (−20° C.) to that at room temperature.

TABLE 1

|  | Compositions of electrolyte [V %] (solute: 1M $LiPF_6$) | Cycle life characteristics (300 cycles) [%] | Initial discharge capacity [mAh] | High-temperature characteristics (85° C., 96 hours) | Low-temperature characteristics (−20° C.) [%] |
| --- | --- | --- | --- | --- | --- |
| Example 1 | EC/DMC/EMC/PA (50/15/25/10) | 88.2 | 2030 | No open | 80 |
| Example 2 | EC/DMC/DEC/PA (50/15/25/10) | 88.6 | 1975 | No open | 85 |
| Comparative example 1 | EC/DMC (50/50) | 88.6 | 2051 | Open (after 2 hours) | 20 |
| Comparative | EC/DMC/PC | 68.8 | 1848 | No open | 60 |

TABLE 1-continued

| | Compositions of electrolyte [V %] (solute: 1M LiPF$_6$) | Cycle life characteristics (300 cycles) [%] | Initial discharge capacity [mAh] | High-temperature characteristics (85° C., 96 hours) | Low-temperature characteristics (−20° C.) [%] |
|---|---|---|---|---|---|
| example 2 | (45/45/10) | | | | |
| Comparative example 3 | EC/DMC/PA (40/30/30) | 67.3 | 2030 | No open | 85 |
| Comparative example 4 | EC/DMC/PA (50/15/25/10) | 70.0 | 2020 | Open (after 3 hours) | 80 |
| Comparative example 5 | EC/DMC/EMC/EA | 75.0 | 2025 | Open (after 4 hours) | 78 |

As shown in Table 1, the cell of Comparative Example 1 exhibited good initial discharge capacity and cycle life characteristics, but bad low-temperature characteristics. The cell of Comparative Example 2 exhibited inferior initial discharge capacity, cycle life and low-temperature characteristics. The cell of Comparative Example 3 exhibited good low-temperature characteristics, but inferior discharge capacity and cycle life characteristics. Comparative example 4 exhibited good low-temperature characteristics, but bad discharge capacity and cycle life characteristics. Comparative example 5 exhibited good initial discharge capacity and low-temperature characteristics, but cycle life and high-temperature storage characteristics.

On the other hand, the cells of Examples 1 to 2 exhibited good cycle life characteristics and initial discharge capacity. This result is caused that the second and third organic solvents help to decrease the viscosity and freezing point of ethylene carbonate. Furthermore, the cells of Examples 1 and 2 also exhibited good low-temperature characteristics of at least 80% of room temperature capacity. This result is caused that propyl acetate has a low viscosity, a dielectric constant twice that of other solvents, and a low freezing point. Furthermore, Examples 1 and 2 using propyl acetate exhibited good high-temperature storage characteristics. It is believed that propyl acetate has a higher boiling point (102° C.) than methyl acetate (58° C.) or ethyl acetate (77° C.).

It is shown from Table 1 that propyl acetate as a low freezing point solvent can improve the low-temperature characteristics, but an excess of propyl acetate deteriorates the cycle life characteristics (see Comparative Example 3).

It is also shown that the second and third solvents act to decrease the high viscosity and freezing point of ethylene carbonate, and the fourth solvent (propyl acetate) acts to decrease the high freezing point of ethylene carbonate. Accordingly, the electrolyte of the present invention can provide a rechargeable lithium battery exhibiting good capacity, cycle life and low-temperature characteristics.

The charge and discharge characteristics of the cells according to Examples 1 and 2 and Comparative Examples 1 to 5 were measured and the results are presented in FIG. 1. As shown in FIG. 1, the cells according to Examples 1 and 2 which included an electrolyte of ethylene carbonate, propyl acetate of less than 30% by volume, and two linear carbonates exhibited the cycle life capacity retention ratio of 88.2 to 88.6%. Whereas, the cells according to Comparative examples 2 to 5 exhibited the cycle life capacity retention ratio of 67.3 to 75.0%. The cycle life capacity retention ratio is the ratio of the cell capacity after 300 charge/discharge cycles to that before the charge/discharge cycles.

Furthermore, the low-temperature characteristics of the cells according to Examples 1 to 2 exhibited the low-temperature capacity retention ratio of 80 to 85%, whereas those of the cells according to Comparative Examples 1 and 2 exhibited the low-temperature capacity retention ratio of 20 to 60%. The low-temperature capacity retention is defined as the ratio of the cell capacity at low temperature (−20° C.) to that at room temperature.

The electrolyte of the present invention can therefore provide a rechargeable lithium battery using LiCoO$_2$, LiMn$_x$O$_2$, LiNi$_{1-x}$Co$_x$M$_y$O$_2$, particularly LiNi$_{1-x}$Co$_x$M$_y$O$_2$, exhibiting good capacity, cycle life and low-temperature characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a rechargeable lithium battery consisting essentially of:
   a cyclic carbonate, wherein the electrolyte includes 20–60% by volume of said cyclic carbonate;
   at least two linear carbonates selected from the group consisting of diethyl carbonate, methyl propyl carbonate, ethyl methyl carbonate, and dimethyl carbonate, wherein the amount of linear carbonates is 30–77.5% by volume of said electrolyte;
   propyl acetate, wherein the amount of said propyl acetate is 2.5–30% by volume of said electrolyte; and
   a lithium salt.

2. The electrolyte of claim 1 wherein the electrolyte includes 20 to 60% by volume of the cyclic carbonate, 2.5 to 30% by volume of the propyl acetate, and 30 to 77.5% by volume of the linear carbonate.

3. The electrolyte of claim 1 wherein the lithium salt is selected from the group consisting of lithium hexafluorophosphate (LiPF$_6$), lithium tetrafluoroborate (LiBF$_4$), lithium hexafluoroasenate (LiAsF$_6$), lithium percholate (LiClO$_4$), lithium trifluoromethanesulfonate (CF$_3$SO$_3$Li) and a mixture thereof.

4. The electrolyte of claim 1 wherein the concentration of the lithium salt is 0.5 to 2.0M.

5. The electrolyte of claim 1, wherein said cyclic carbonate comprises ethylene carbonate.

6. A rechargeable lithium battery comprising:
   a positive electrode including a transition metal oxide;
   a negative electrode including carbonaceous negative active materials from or into which lithium ions are deintercalated or intercalated; and
   an electrolyte consisting essentially of a cyclic carbonate, wherein the electrolyte includes 20–60% by volume of said cyclic carbonate; at least two linear carbonates selected from the group consisting of diethyl carbonate, methyl propyl carbonate, ethyl methyl carbonate and dim ethyl carbonate, wherein the amount of linear carbonates is 30–77.5% by volume of said electrolyte; propyl acetate, wherein the amount of propyl acetate is 2.5–30% by volume of said electrolyte; and a lithium salt.

7. The rechargeable lithium battery of claim 6 wherein the negative active material is a globular material produced by carbonizing mesophase globular particles or graphite fiber produced by carbonizing fibrous mesophase pitch and graphitizing the carbonizied pith, and has a lattice spacing of $d_{002}$ of 3.35–3.38Å in the (002) plane according to an X-ray diffraction, a crystallinity size in the direction of the c axis of Lc of 20 nm and an exothermic peak at a temperature of 700° C. or more.

8. The rechargeable lithium battery of claim 6 wherein the positive active material is selected from the group consisting of $LiCoO_2$, $LiNi_{1-x}Co_xM_yO_2$ 

wherein x is 0 to 0.2, y is 0.001 to 0.02, and M is selected from the group consisting of Mg, Ca, Sr, Ba and La, and $LiMn_xO_2$ 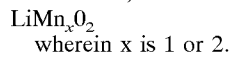

wherein x is 1 or 2.

9. The rechargeable lithium battery of claim 6 wherein the electrolyte includes 20 to 60% by volume of the cyclic carbonate, 2.5 to 30% by volume of propyl acetate, and 30 to 77.5% by volume of linear carbonate.

10. The rechargeable lithium battery of claim 6 wherein the lithium salt is selected from the group consisting of lithium hexafluorophosphate ($LiPF_6$), lithium tetrafluoroborate ($LiBF_4$), lithium hexafluoroasenate ($LiAsF_6$), lithium percholate ($LiClO_4$), lithium trifluoromethanesulfonate ($CF_3SO_3Li$) and a mixture 20 thereof.

11. The rechargeable lithium battery of claim 6 wherein the concentration of the lithium salt is 0.5 to 2.0M.

12. The rechargeable lithium battery of claim 6, wherein said cyclic carbonate comprises ethylene carbonate.

* * * * *